(12) United States Patent
Naderer

(10) Patent No.: US 11,780,099 B2
(45) Date of Patent: Oct. 10, 2023

(54) ROBOT-AIDED GRINDING APPARATUS

(71) Applicant: FerRobotics Compliant Robot Technology GmbH, Linz (AT)

(72) Inventor: Ronald Naderer, Oberneukirchen (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 594 days.

(21) Appl. No.: 16/090,534

(22) PCT Filed: Apr. 4, 2017

(86) PCT No.: PCT/EP2017/057982
§ 371 (c)(1),
(2) Date: Oct. 1, 2018

(87) PCT Pub. No.: WO2017/174577
PCT Pub. Date: Oct. 12, 2017

(65) Prior Publication Data
US 2019/0111570 A1    Apr. 18, 2019

(30) Foreign Application Priority Data

Apr. 7, 2016  (DE) .................... 10 2016 106 416.5

(51) Int. Cl.
*B25J 11/00*  (2006.01)
*B24B 27/00*  (2006.01)
(Continued)

(52) U.S. Cl.
CPC ....... *B25J 11/0065* (2013.01); *B24B 27/0015* (2013.01); *B24B 27/0038* (2013.01); *B25J 9/101* (2013.01); *B25J 9/123* (2013.01)

(58) Field of Classification Search
CPC ... B25J 11/0065; B25J 11/0055; B25J 11/005; B25J 9/101; B25J 9/123; B25J 9/047;
(Continued)

(56) References Cited

U.S. PATENT DOCUMENTS 3,353,305 A * 11/1967 Wolf ..................... B24B 41/047
                                                                  451/24
4,604,835 A    8/1986 Borin
(Continued)

FOREIGN PATENT DOCUMENTS

CN    2282479 Y    5/1998
CN    201848748 U  6/2011
(Continued)

OTHER PUBLICATIONS

"English Translation of Japanese Office Action for JP Application No. 2018-553105", dated Mar. 23, 2021, pp. 1-10.
(Continued)

Primary Examiner — Joel D Crandall
Assistant Examiner — Michael A Gump
(74) Attorney, Agent, or Firm — Murphy, Bilak & Homiller, PLLC

(57) ABSTRACT

Described is an apparatus for robot-aided grinding, comprising the following: a manipulator, a linear actuator, and a grinding machine which includes a rotating grinding tool and is connected to the manipulator via the linear actuator. The apparatus further comprises a protective cover that partially surrounds the rotating grinding tool, the rotating grinding tool protruding from the protective cover at least on a first side. An adjusting mechanism is provided which connects the protective cover to the grinding machine and is designed to adjust the position of the protective cover in relation to the grinding machine.

15 Claims, 7 Drawing Sheets

(51) Int. Cl.
B25J 9/10 (2006.01)
B25J 9/12 (2006.01)

(58) Field of Classification Search
CPC . B25J 9/1005; B25J 9/1015; B25J 9/10; B25J 9/144; B25J 15/0266; B25J 15/0273; B25J 17/0258; B25J 17/0266; B25J 18/02; B25J 18/025; B24B 27/0015; B24B 27/0038; B24B 41/005; B24B 41/002; B24B 49/10; B24B 49/00
USPC .............................. 451/259, 9–12, 14, 15, 24
See application file for complete search history.

(56) References Cited

U.S. PATENT DOCUMENTS

| | | | |
|---|---|---|---|
| 4,860,500 A | 8/1989 | Thompson | |
| 4,894,597 A * | 1/1990 | Ohtomi | B24B 9/00 318/568.22 |
| 5,265,195 A * | 11/1993 | Jinno | B25J 11/0065 901/41 |
| 5,299,389 A | 4/1994 | Yonaha et al. | |
| 5,355,631 A * | 10/1994 | Whittington | B23Q 5/22 451/21 |
| 5,448,146 A | 9/1995 | Erlbacher | |
| 2008/0161829 A1* | 7/2008 | Kang | B25J 9/101 606/130 |
| 2012/0108154 A1* | 5/2012 | Nakamura | B24B 55/05 451/451 |
| 2014/0005831 A1* | 1/2014 | Naderer | B25J 11/0065 700/258 |

FOREIGN PATENT DOCUMENTS

| | | | | |
|---|---|---|---|---|
| CN | 202155778 U | 3/2012 | | |
| CN | 104249195 A | 12/2014 | | |
| DE | 102007000415 A1 | 2/2009 | | |
| DE | 102011006679 A1 | 9/2012 | | |
| EP | 2308644 A2 * | 4/2011 | ......... | B24B 27/0076 |
| FR | 2983105 A1 | 5/2013 | | |
| GB | 2205770 A | 12/1988 | | |
| JP | 48-38493-01 | 9/1946 | | |
| JP | S60020893 | 2/1985 | | |
| JP | 60-120762 | 8/1985 | | |
| JP | H02-083162 | 3/1990 | | |
| JP | 06-091581 | 4/1994 | | |
| JP | 7-37559 | 7/1995 | | |
| JP | H0737559 U | 7/1995 | | |
| JP | 2016000435 A | 1/2016 | | |
| WO | WO-2012123552 A1 * | 9/2012 | ........... | B25J 9/1633 |

OTHER PUBLICATIONS

"English Computer Translation of CN Office Action for CN Application No. 2017800347860", Notification of first instance review comments, Jun. 28, 2021, pp. 1-20.

Yiguang, Jing, "Mechanism, Diagnosis and Reduction of Cylindrical Gear Machining Error", Shenyang Publishing House, Jul. 1991, pp. 235-237. (see the English Computer Translation of CN Office Action above).

* cited by examiner

ROBOT-AIDED GRINDING APPARATUS

TECHNICAL FIELD

This disclosure relates to aspects of a robot-supported grinding apparatus in which a grinding machine with a rotating grinding tool is guided by a manipulator (e.g. an industrial robot).

BACKGROUND

Grinding and polishing processes are playing an increasingly important part in the surface finishing of workpieces. In automated, robot-supported manufacturing, industrial robots are being employed, with the aid of which, e.g. grinding processes can be automated.

In robot-supported grinding apparatuses, a grinding machine with a rotating grinding tool (e.g. grinding disc) is guided by a manipulator, for example, an industrial robot. During the grinding process, the so-called TCP (Tool Center Point) moves along an (in advance programmable, e.g. by means of Teach-In) path (trajectory). The specified path of the TCP determines, for every point in time, the position and orientation of the TCP, and thus of the grinding machine, as well. The robot control that controls the movement of the manipulator therefore generally includes a position control.

For surface finishing processes such as grinding, polishing, etc. it is usually not sufficient to only control the position of the tool, as the processing force (the force between the tool and the workpiece) also plays an important role in the finishing results. For this reason, the tool is generally not rigidly connected to the TCP of the manipulator, but rather via an elastic element which, in the simplest case, may be a spring. In order to adjust the processing force, in many cases a regulation (closed loop control) of the processing force is needed. For the purpose of implementing a force control, the elastic element can be a separate linear actuator that is mechanically coupled between the TCP of the manipulator and the tool (e.g. between TCP and a grinding machine on which a grinding disc is mounted). The linear actuator can be relatively small in comparison to the manipulator and is used, for the most part, to control the processing force while the manipulator moves the tool (together with the linear actuator) along the previously programmed trajectory in a position-controlled manner.

In practice, the wear of the tool may cause problems, e.g. during grinding. A grinding disc becomes worn in the course of the grinding process, as a result of which the diameter of the grinding disc is reduced. As a consequence of this, not only is the circumferential speed (which may also be a relevant processing parameter) reduced, but the position of the grinding machine (in particular that of the axis of rotation of the grinding tool) relative to the surface of the workpiece is also changed. The more the grinding disc is worn down, the closer the grinding machine must be brought to the surface of the workpiece.

The aforementioned wear-related reduction of the size of the grinding tool (grinding disc) has, among others, two consequences. In certain situations, when the trajectory of the TCP has been previously specified, the grinding tool may contact the workpiece surface late (and consequently at the wrong point). Furthermore, the size of the gap between the workpiece surface and any possibly existing protective cover that is mounted on the grinding machine and partially surrounds the grinding disc also changes. The size of this gap influences the effectiveness of a possibly existing suction system (for the removal of grinding dust).

Various embodiments described herein are directed to a robot-supported grinding apparatus that at least partially compensates for the negative or undesired influences resulting from the wear of the grinding tool as well as to related methods.

SUMMARY

An apparatus for robot-supported grinding is described. In accordance with one embodiment, the apparatus comprises the following: a manipulator, a linear actuator and a grinding machine with a rotating grinding tool. The grinding machine is coupled with the manipulator via the linear actuator. Further, the apparatus comprises an end stop that defines the maximum deflection of the linear actuator, wherein the position of the end stop is adjustable.

In accordance with a further embodiment the apparatus for robot-supported grinding comprises the following: a manipulator, a linear actuator and a grinding machine with a rotating grinding tool, wherein the grinding machine is coupled with the manipulator via the linear actuator. The apparatus further comprises a protective cover that partially surrounds the rotating grinding tool, wherein the rotating grinding tool protrudes from the protective cover on at least one side. A positioning device is provided that connects the protective cover to the grinding machine and that is designed to adjust the position of the protective cover relative to the grinding machine.

In accordance with another embodiment, the apparatus for robot-supported grinding comprises the following: a manipulator, a linear actuator and a grinding machine with a rotating grinding tool, wherein the grinding machine is coupled with a TCP of the manipulator via the linear actuator. The apparatus further comprises a protective cover that partially surrounds the grinding tool. The protective cover is rigidly connected to the TCP of the manipulator such that the rotating grinding tool protrudes from the protective cover on at least one first side.

Further, a method for operating a robot-supported grinding device comprising a manipulator, a linear actuator with an adjustable end stop and a grinding machine with a rotating grinding tool is described. Here the grinding machine is coupled with the manipulator via the linear actuator. In accordance with one embodiment, the method comprises adjusting a position of the end stop that defines the maximum deflection of the linear actuator.

In accordance with a further embodiment, the method comprises pressing the grinding tool against a reference surface with the aid of the manipulator, wherein at the same time a first side of a protective cover rests against a stop (41). The protective cover surrounds the grinding tool at least partially and the rotating grinding tool protrudes from the protective cover on at least one side.

BRIEF DESCRIPTION OF THE DRAWINGS

Various embodiments are described in greater detail in the following using the examples shown in the figures. The figures are not necessarily true to scale and the invention is not limited to the illustrated aspects. Instead, emphasis is given to illustrating the underlying principles of the embodiments described herein. With regard to the figures:

in FIG. 6a the grinding disc is new and in FIG. 6b the grinding disc is already partially worn.

DETAILED DESCRIPTION

Figure 1:
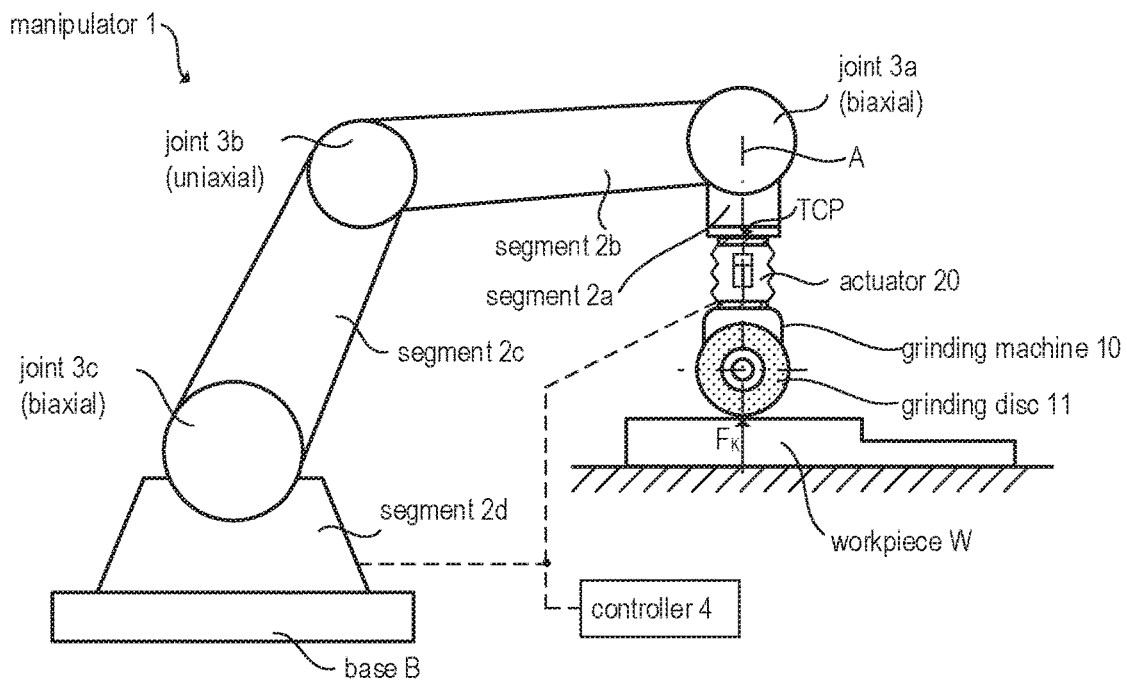
FIG. 1 is an exemplary schematic illustration of a robot-supported grinding apparatus with a grinding machine that is coupled with an industrial robot by means of a force-controlled linear actuator.

Before describing the various embodiments in detail, a general example of a robot-supported grinding apparatus will be described. This comprises a manipulator 1 (for example, an industrial robot) and a grinding machine 10 with rotating grinding tool (grinding disc), wherein the grinding machine 10 is coupled with the tool center point (TCP) of the manipulator 1 via a linear actuator 20. In the case of an industrial robot having six degrees of freedom, the manipulator may consist of four segments 2a, 2b, 2c and 2d, each of which is connected via joints 3a, 3b and 3c. The first segment is usually rigidly connected to the base B (which, however, need not necessarily be the case). The joint 3c connects the segments 2c and 2d. The joint 3c may be biaxial and allow for rotation of the segment 2c around a horizontal axis of rotation (elevation angle) and around a vertical axis of rotation (azimuth angle). The joint 3b connects the segments 2b and 2c and allows for a swivel movement of the segment 2b relative to the position of the segment 2c. The joint 3a connects the segments 2a and 2b. The joint 3a can be biaxial, thus (similar to the joint 3c) allowing for a swivel movement in two directions. The TCP has a permanent position relative to the segment 2a, wherein this usually includes a rotational joint (not shown) that allows for a rotational movement around a longitudinal axis A (designated in FIG. 1 as a dash-dotted line) of the segment 2a. An actuator is assigned to each axis of a joint and can effect a rotational movement around the respective joint axis. The actuators in the joints are controlled by a robot control 4 in accordance with a robot program. The TCP can be positioned as desired (within certain limits and with any desired orientation of the axis A).

The manipulator 1 is usually position-controlled, i.e. the robot control can determine the pose (position and orientation) of the TCP and can move the latter along a previously defined trajectory. When the actuator 20 rests against an end stop, the pose of the TCP also defines the pose of the grinding tool. As mentioned early on, the actuator 20 serves to adjust the contact force (processing force) between the tool (grinding disc 11) and the workpiece W to a desired value during the grinding process. Controlling the processing force directly via the manipulator 1 is generally too imprecise for grinding applications because, due to the high inertia of the segments 2a-2c of the manipulator 1, quickly compensating force peaks (e.g. when the grinding tool contacts the workpiece 40) using common manipulators is virtually impossible. For this reason, the robot control is configured to control the pose (position and orientation) of the TCP, whereas controlling the contact force (see also FIG. 2, Contact Force $F_K$) is performed exclusively by the actuator 20 coupled between the grinding machine 10 and the manipulator 1.

As already mentioned, the contact force $F_K$ between the tool (grinding disc 11) and the workpiece W can be adjusted during the grinding process with the aid of the (linear) actuator 20 and a force control unit (which, for example, may be implemented in the control 4) so that the contact force $F_K$ between grinding tool and workpiece W corresponds to a specifiable desired value. Thereby the contact force is a reaction to the actuator force $F_A$ with which the linear actuator 20 presses against the workpiece surface S (see also FIG. 2). If no contact occurs between workpiece W and grinding disc 11, the actuator 20, as a reaction to this absence of contact force $F_K$, moves up to an end stop (not shown in FIG. 1 or integrated in the actuator 20). The position control of the manipulator 1 (which can also be integrated in the control 4) can operate completely independently of the force control of the actuator 20. The actuator 20 is not responsible for positioning the grinding machine 10, but instead is only responsible for adjusting and maintaining the desired contact force during the grinding process, as well as for detecting contact between tool and workpiece. A contact can be determined, for example, when the deflection of the actuator 20, beginning at the end stop, becomes smaller or the change in the deflection of the actuator 20 becomes negative.

The actuator may be a pneumatic actuator, e.g. a double-acting pneumatic cylinder. Other pneumatic actuators, however, are also applicable such as, e.g. bellows cylinders and air muscles. As an alternative, direct electric drives (gearless) may also be considered. In the case of a pneumatic actuator, the force control itself can be realized using a control valve, a regulator (implemented in the control 4) and a compressed air reservoir. The specific implementation, however, is of no importance for the further description and will therefore not be discussed in detail.

Figure 2:
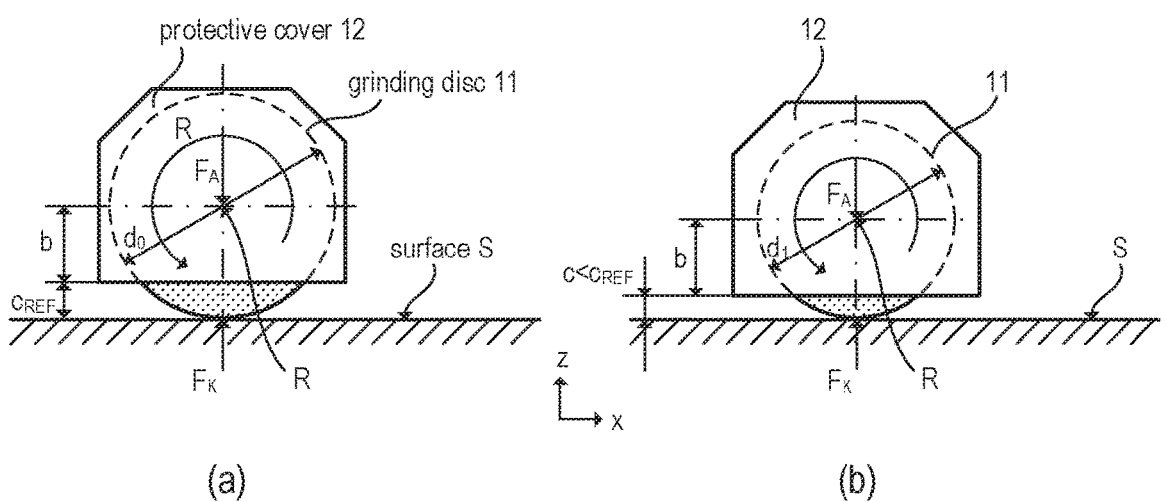
FIG. 2 illustrates with the use of schematic sketches the effect that a grinding disc with a wear-induced reduction in diameter has on the position of a protective cover.

FIG. 2 shows—in a front view (i.e. in the direction of the axel of rotation of the grinding disc 11)—an example of a grinding disc 11 that is partially covered by a protective cover 12. In FIG. 2 the grinding machine 10, the actuator 20 and the manipulator 1 are omitted for the sake of simplicity. FIGS. 2a (on the left) and 2b (on the right) only differ in the size of the respective grinding discs 11. In FIG. 2a, the diameter $d_0$ of the grinding disc 11 is larger than in FIG. 2b, in which the diameter $d_1$ is smaller due to wear ($d_1 < d_0$). When—as is usually the case—the protective cover 12 is mounted on the grinding machine 10 (not shown in FIG. 2), the protective cover 12 moves together with the grinding machine 10 (and its axis of rotation R). In this example, when the grinding disc 11 contacts a surface S (e.g. of a workpiece), the size of the gap $c_{REF}$ or c (the distance between the surface S and the bottom edge of the protective cover 12) depends on the diameter of the grinding disc 11.

In the case depicted in FIG. 2a (a new grinding disc with a diameter $d_0$), the size of the gap $c_{REF}$ equals the difference between the radius $d_0/2$ of the grinding disc and the distance b between axis of rotation R and the bottom edge of the protective cover ($c_{REF} = d_0/2 - b$). Here the value of the distance b remains the same while the grinding machine 10 is in operation since the protective cover 12, as is usually the case, is rigidly mounted on the grinding machine 10. In the case depicted in FIG. 2b (worn grinding disc with diameter $d_1$), the size of the gap c is smaller ($c < c_{REF}$) because the diameter $d_1$ of the grinding disc 11 is smaller than in the case of FIG. 2a ($c = d_1/2 - b$). The size of the gap c or $c_{REF}$ can be significant, for example, when a suction system (not shown) for the removal of grinding dust is coupled with the protective cover. The air is suctioned off through the gap between the surface S and the protective cover 12. In order to achieve good dust extraction, the size of the gap should correspond to a value $c_{REF}$ which—depending on the use and implementation—lies within the range of a few centimeters. A new grinding disc with a diameter, e.g. of 150 mm ($d_0 = 150$ mm) can be worn down to 75 mm during use. For practical application this means that a gap size c must be chosen to be larger than $c_{REF}$ (resulting in a less than optimum suction performance), so that the gap size c remains larger than zero (at least a few millimeters) when the grinding disc becomes worn. Alternatively, the position of the protective cover can be manually adapted by service personnel in regular sequences (in order to change the value b), which is relatively work-intensive and not desirable in robot-supported manufacturing.

Figure 3:
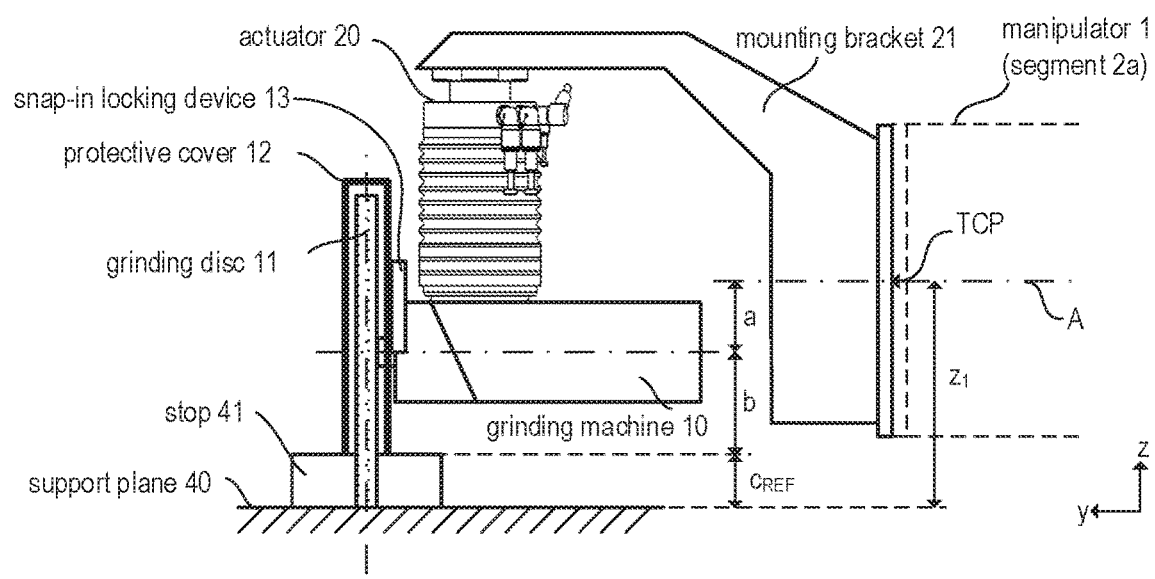
FIG. 3 is a schematic illustration of an embodiment in which the protective cover of a grinding disc is coupled with the grinding machine via a snap-in locking device.

The embodiment shown in FIG. 3 allows for an automatic adaptation of the gap size c, ensuring that it remains more or less constant and that it corresponds to the (desired) value $c_{REF}$ ($c \approx c_{REF}$) as the size of the grinding disc 11 changes. FIG. 3 shows, in a side view (the line of sight lying perpendicular to the axis of rotation R of the grinding disc), a grinding machine 10 with a grinding disc 11 that is partially surrounded by a protective cover 12. The grinding machine 10 is mechanically connected to the manipulator 1 via the actuator 20. In the illustrated example, a mounting bracket 21 of a form approximately resembling an L is arranged between actuator 20 and the outmost segment 2a of the manipulator 1 (see also FIG. 1). The mounting bracket 21 is intended for mounting the linear actuator 20 on the manipulator 1, not coaxially to axis A of segment 2a, but rather tilted at 90°, so that the axis of rotation R of the grinding machine essentially lies parallel to axis A. Depending on the intended use and specific design of the robot cell, the mounting bracket can also be omitted (the actuator 20 is then directly mounted on the manipulator 1), or a mounting bracket may be used that has an angle other than 90°.

In contrast to what was described above with regard to FIG. 2, here the protective cover 12 is not rigidly fixed on the grinding machine 10, but rather by means of a snap-in locking device 13 which allows the protective covering 12 to be shifted in respect to the grinding machine 10. The snap-in locking device 13 is constructed such that allows the protective cover 12 to be shifted, relative to the housing of the grinding machine (and thus also relative to the grinding disc), linearly at a right angle to the axis of rotation R (thus also generally parallel to the effective direction of the actuator 20). If the diameter of the grinding disc 11 changes due to wear, for example, from $d_0$ to $d_1$, the protective cover can be raised by a value $(d_0 - d_1)/2$ by means of the snap-in locking device 13 in order to maintain a gap size between the workpiece surface and the bottom side of the protective cover that at least approximately corresponds to the desired value $c_{REF}$ (cf. also FIG. 2). When the protective cover 12 is shifted, the snap-in locking device 13 can snap into the desired position (distance b) and the protective cover 12 remains at the desired position relative to the grinding machine (at a distance of $c_{REF}$ to the workpiece).

Instead of a snap-in locking device, any other positioning device by means of which the protective cover 12 can be fixated at various positions (relative to the grinding machine 10) can also be used. One possible alternative would be, e.g. a self-retaining positioning device with which the distance b (see FIG. 3) can be adjusted by means of two friction-coupled elements. In such a case, the static friction between the two elements in the positioning device must be significantly greater than the weight force and any occurring inertia forces of the protective cover 12. In order to change the distance b, a force must be applied that is greater than the static friction of the positioning device. A further alternative would be a (piston) rod blocking device which, however, is not generally self-blocking, i.e. upon releasing the rod blocking device (before adjustment), the protective cover 12 would fall to the lowest position.

Since the grinding disc becomes smaller during normal operation, it is enough for the positioning device (e.g. the snap-in locking device 13) to only allow for an adaptation of the position of the protective cover 12 (i.e. the distance b) in one direction—towards smaller distances b—wherein, when the grinding disc 11 is replaced, the positioning device is reset at its maximum distance ($b_{MAX}$). The snap-in locking device may therefore also include at least one locking latch that allows the position to be linearly adjusted in one direction (towards smaller distances b) while adjustment of the position in the other direction (towards greater distances b) is blocked by the locking latch (similar to a ratchet, see also FIG. 5).

A situation is now assumed in which the protective cover 12 is, at the beginning, so adjusted that the gap size c with a new, unworn grinding disc 11 having a diameter $d_0$ (e.g. $d_0 = 150$ mm) corresponds exactly to the desired value $c_{REF}$ ($c = c_{REF}$). After a few rounds of grinding, the grinding disc is partially worn and the diameter of the grinding disc 11 has been reduced to a value of $d_1$ (e.g. $d_1 = 140$ mm), as a result of which the size of the gap c has also been reduced (e.g. by 10 mm, $c < c_{REF}$). In order to enlarge the gap size c back to its original value, the distance b must be adapted (in the present example, b would have to be reduced by 10 mm). In order to be able to automatedly adjust the snap-in locking device 13, which does not require its own drive, when the grinding disc becomes partially worn, a support plane 40 (e.g. a plane reference surface) is located near the manipulator (e.g. next to the workpiece W in the robot cell) on which at least one stop 41 is arranged. The stop 41 defines a plane that lies parallel to the support plane 40 and that is at a distance to the latter that corresponds to the desired value $c_{REF}$. The manipulator 1 is programmed to periodically (e.g. after every or every second grinding operation) move the grinding machine 10 towards the support plane 40 and into a reference position, pressing the grinding disc 11 against the support plane 40—similarly to being pressed against a workpiece but while the grinding disc is not rotating. The at least one stop 41 is arranged such that when the grinding machine is in the reference position—the bottom side of the protective cover 12 rests against the at least one stop 41. By pressing the grinding disc 11 against the support plane 40 (reference surface), the protective cover 12 is pushed upwards until the gap size c once again (approximately) corresponds to the desired value $c_{REF}$.

Figure 4:
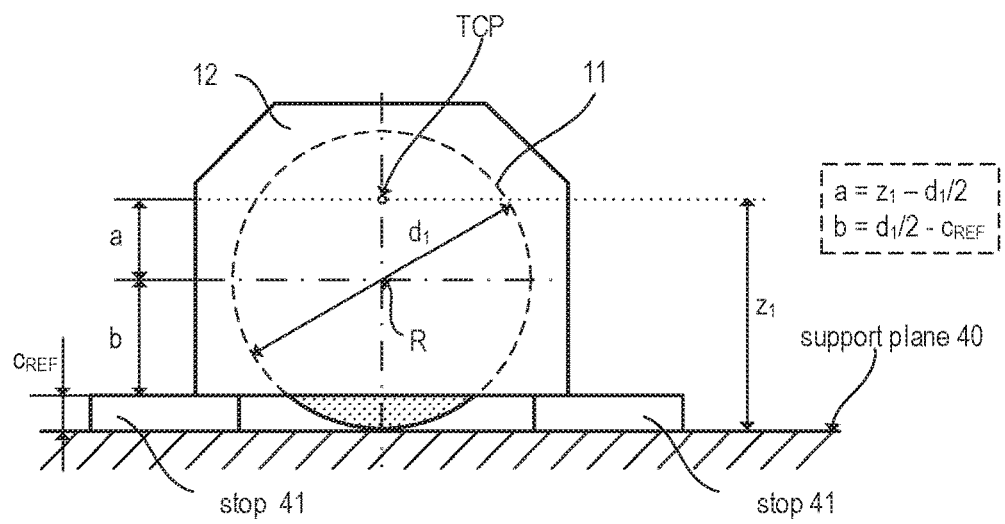
FIG. 4 is a front view of the grinding disc including the protective cover shown in FIG. 3 during the automatic adjustment of the position of the protective cover with the aid of a support plane and at least one stop.

The adjustment procedure for the gap size $c_{REF}$ is illustrated in FIG. 4, which shows the grinding disc 11 together with the protective cover 12. FIG. 4 is a front view of FIG. 3 (in the direction of the axis of rotation R) that corresponds to the side view shown in FIG. 3. By moving the manipulator to the reference position, the distance b is adjusted to the value $d_1/2 - c_{REF}$, as, in the reference position, the grinding disc 11, as shown in FIG. 4, contacts the support plane 40 (during which the axis of rotation R lies substantially parallel to the support plane 40) and the gap size $c_{REF}$ is determined by the at least one stop 41. With the aid of the aforementioned force control of actuator 20, the actuator force can be adjusted during this adjustment process such that the grinding disc 11 rests firmly against the support plane 40. When the grinding machine 10 is again taken off and moved away from the support plane, the protective cover 12 can no longer slide back into its original position as the self-braking function of the positioning device prevents this (when the snap-in locking device 13 is implemented, e.g. using a locking latch or, alternatively, by means of static friction as described above).

Figure 5A:
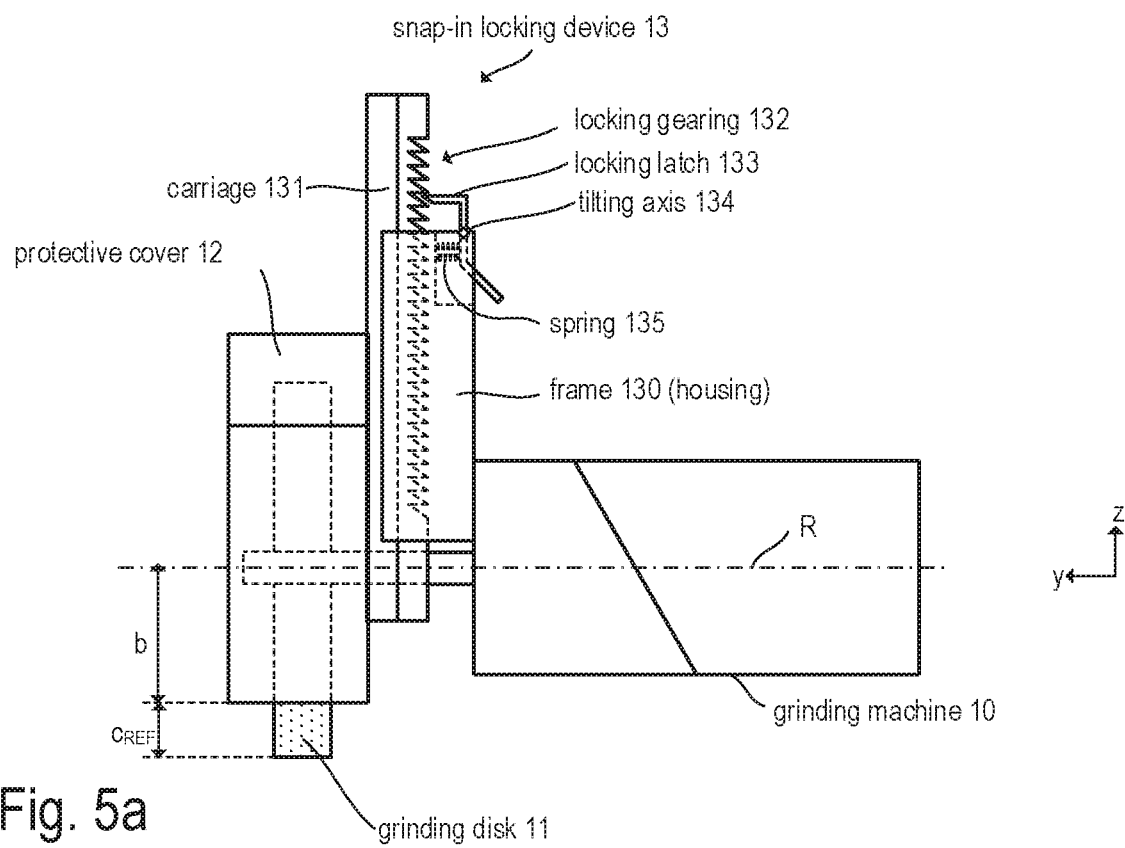
FIG. 5 provides a more detailed side view (perpendicular to the axis of rotation of the grinding disc, FIG. 5a) and a front view (parallel to the axis of rotation of the grinding disc, FIG. 5b) of an example of the snap-in locking device shown in FIG. 3.
Figure 5B:
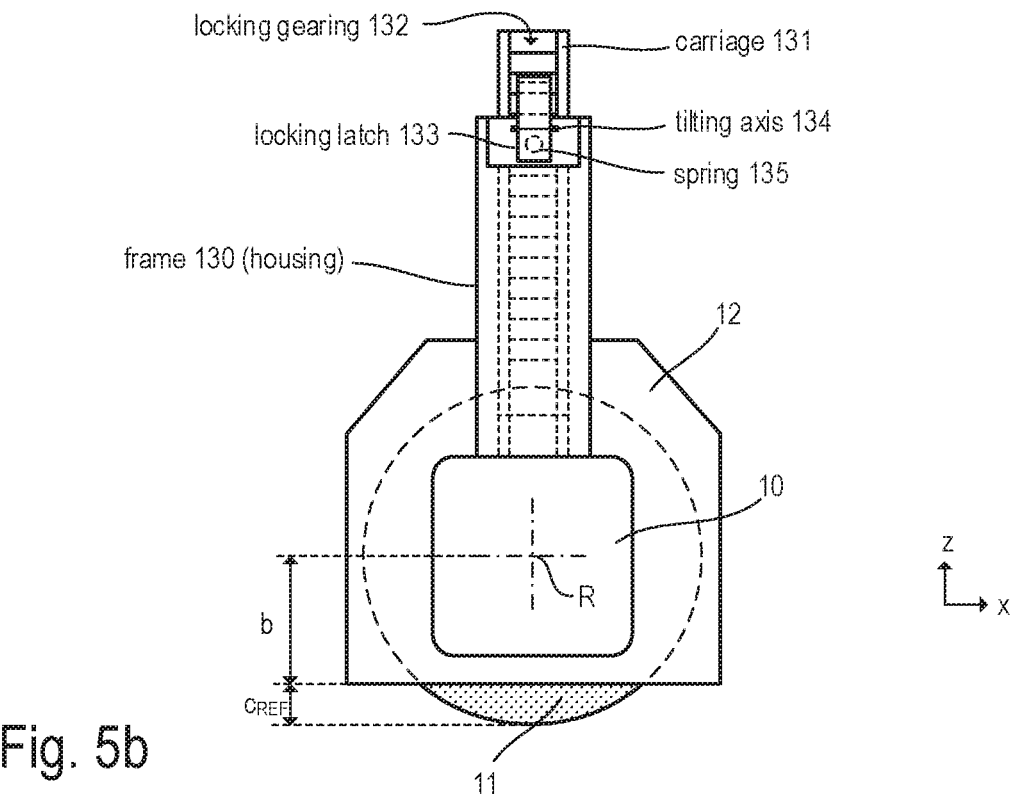

In FIG. 5, an embodiment of the snap-in locking device of FIG. 3—as one implementation of the locking device between the protective cover 12 and the grinding machine 10—is shown in greater detail. FIG. 5a shows a side view (the line of sight lying perpendicular to the axis of rotation R) and FIG. 5b shows a corresponding view from behind (the line of sight lying parallel to the axis of rotation R). The grinding disc 11 is connected to the motor of the grinding machine 10 via the motor shaft (axis of rotation R). The protective cover 12 is connected to the grinding machine 10 via the snap-in locking device 13. The function of the snap-in locking device was described above. FIG. 5 serves to illustrate a possible implementation of the snap-in locking device. In accordance with this, the snap-in locking device 13 comprises a frame 130 on which a carriage 131 that can be shifted in a linear direction is mounted. In the present example, the carriage can be shifted in the direction z. The carriage comprises a locking gearing 132 into which a locking latch 133 engages which is pre-tensioned with a spring 135 and which is pivotally mounted on the frame 130 around a tilting axis 134. The spring 135 presses the locking latch 133 against the locking gearing 132. The locking gearing 132 ensures that the carriage can be shifted in the direction z (the distance b becomes smaller), but that it can only be shifted back in into the original position (against the direction z) when the locking latch 133 is manually lifted against the spring force of the spring 135.

Figure 6:
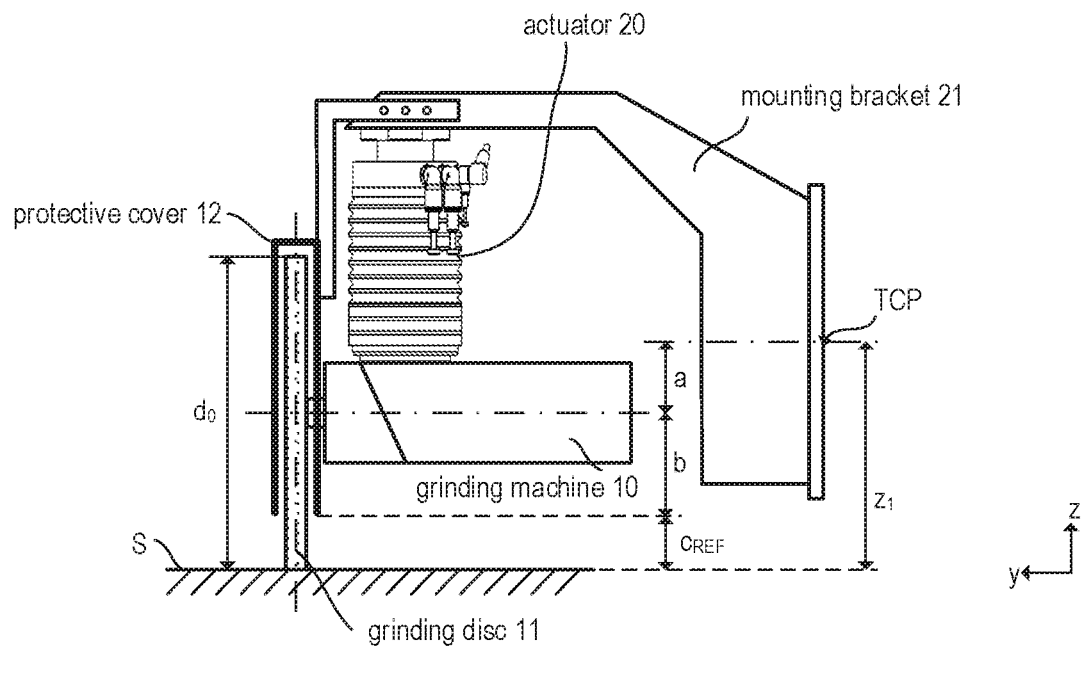
FIG. 6 is a schematic illustration of a further embodiment in which the protective cover of a grinding disc is not connected to the grinding machine, but is instead rigidly connected to the TCP of the manipulator.
Figure 6:
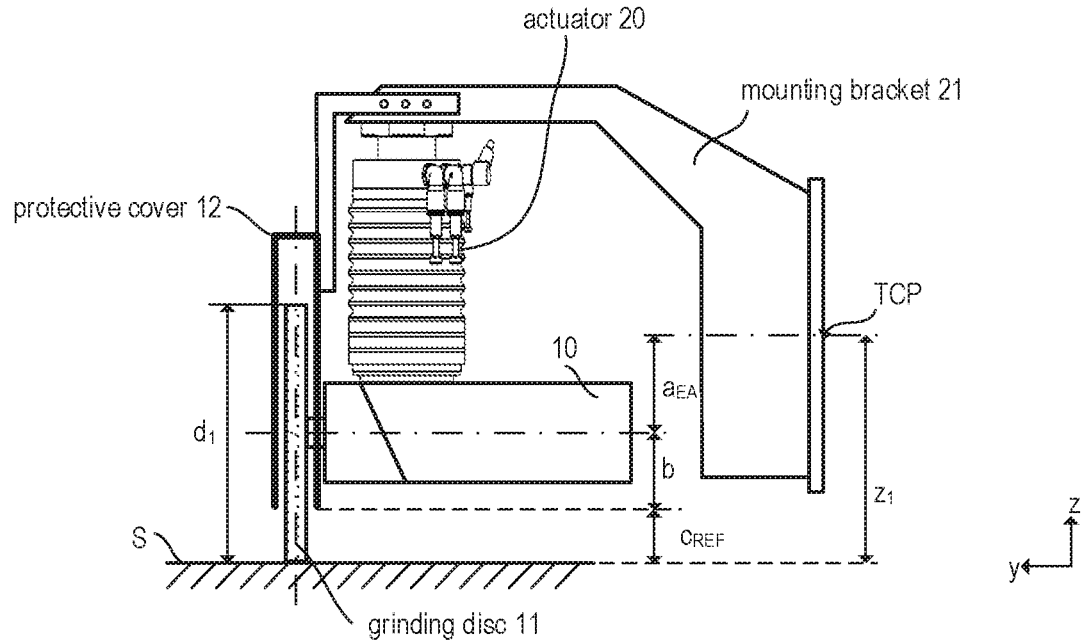

In the example shown in FIGS. 3 and 4, the distance (perpendicular to the surface) between the workpiece surface and the TCP of the manipulator equals $z_1$. The trajectory of the TCP of the manipulator is generally programmed such that the TCP moves at a certain distance $z_1$ to the workpiece surface. During a grinding operation, the distance $z_1$ is usually specified in advance by the robot program. A wear-induced reduction of the grinding disc diameter $d_0$ to a value of $d_1$ ($d_1 < d_0$) is compensated by increasing the deflection a of the actuator 20 according to the value $\Delta a$ ($\Delta a = (d_0 - d_1)/2$). The actuator 20 must adapt its deflection a in order to maintain the desired contact force (see FIGS. 1 and 2). The grinding machine 10 then shifts closer to the workpiece by the value $\Delta a$. In order that the position of the protective cover 12 relative to the surface S of the workpiece W does not change when the grinding disc diameter varies, in the embodiment of FIG. 6 the protective cover 12 is not mounted on the grinding machine, but is instead rigidly connected to the TCP of the manipulator 1 (e.g. is attached via an elbow 21' on the mounting bracket 21). In FIG. 6a the grinding disc 11 is new and not worn (diameter $d_0$), whereas in FIG. 6b the grinding disc is partially worn (diameter $d_1 < d_0$), the situation otherwise being identical.

As, in the present embodiment, the protective cover 12 is rigidly connected to the TCP of the manipulator 1 (i.e. not via the actuator 20), the gap size c does not depend on the diameter of the grinding disc 11, but instead depends only on the pose of the TCP relative to the surface S of the workpiece (see FIG. 6, distance $z_1$). The pose of the TCP can be programmed such that the gap size corresponds to the desired value ($c = c_{REF}$). The distances a and b, however, depend differently on the reducing diameter of the grinding disc, whereby b becomes smaller and a becomes larger and the sum a+b always equals the difference $z_1 - c_{REF}$. It further holds true that $b = d_1/2 - c_{REF}$ and $a = z_1 - d_1/2$. By fixating the protective cover 12 to the TCP (i.e. the relative position between TCP and protective cover does not change as the grinding disc becomes worn down), the snap-in locking device used in the previous embodiment can be omitted.

Figure 7:
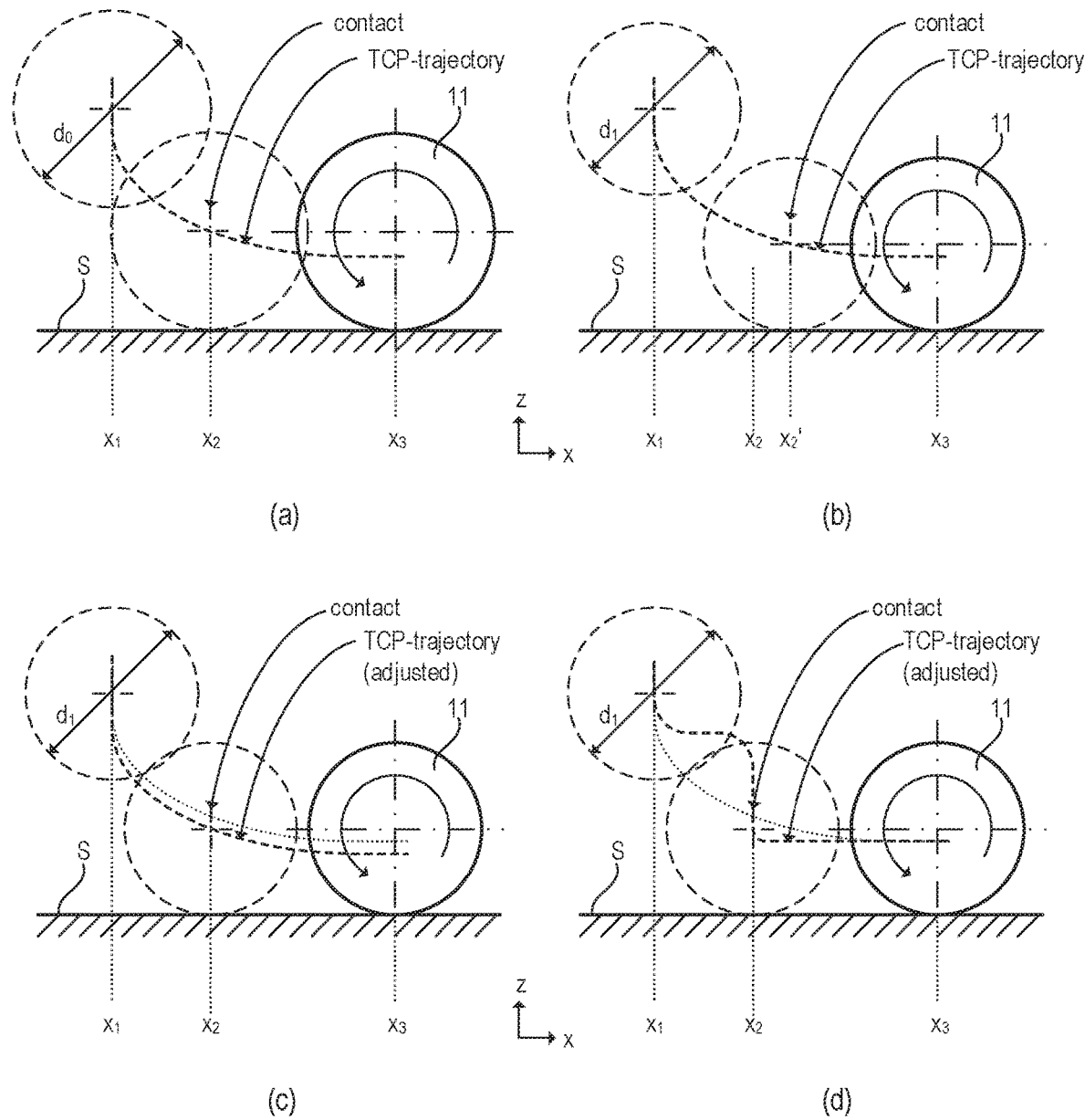
FIG. 7 schematically illustrates the problem that arises when, in a permanently specified trajectory, the TCP of a smaller (due to wear) grinding disc (FIG. 7b) contacts the workpiece later than larger grinding discs (FIG. 7a).

In FIG. 7, a further consequence of the reduction of the diameter of the grinding disc due to wear is illustrated. The diagram in FIG. 7a shows schematically the beginning of a grinding operation, wherein the grinding machine 10 with a rotating grinding disc (new, diameter $d_0$) is moved by the manipulator 1 towards a surface S to be processed. The trajectory of the TCP is exemplarily designated in FIG. 7a. The TCP moves in the direction x at a desired advancement speed $v_x$, while drawing near to the surface S (from the starting position $x_1$). At this stage the actuator 20 exhibits its full deflection $a_{MAX}$ as it rests against its end stop. At the position $x_2$ the grinding disc 11 contacts the surface S and the deflection a of the actuator declines while the force control is active ($a < a_{MAX}$). At the position $x_3$, the grinding disc is in a stationary grinding operation at a constant advancement speed.

In FIGS. 7b to 7d, various situations are depicted in which the diameter of the grinding disc 11 has been reduced, e.g. as a result of wear ($d_1 < d_0$). From the diagram shown in FIG. 7b it can be seen that, when the trajectory of the TCP remains the same, the smaller grinding disc 11 (having the diameter $d_1$) does not contact the surface at the point $x_2$, as in FIG. 7a, but rather at the point $x_2'$ (wherein $x_2' > x_2$), which may not be desirable in some applications as the processed surface is then no longer the same as in the case depicted in FIG. 7a. This problem can be remedied, e.g. by moving the trajectory of the TCP closer to the surface S. Such a situation is depicted in FIG. 7c. The TCP trajectory is shifted by a distance of $(d_0 - d_1)/2$ towards the surface S (against the direction z). This solution, however, requires that the TCP trajectory be adapted (shifted) in dependency on the state of wear of the grinding disc 11 which in some production lines may entail additional unwanted effort.

A different approach is depicted in FIG. 7d. In this case the TCP trajectory is programmed such that the grinding machine at the position $x_2$ only moves vertically with regard to the surface S and thus the trajectory at the position $x_2$ runs at a right angle to the surface S. In this case the diameter of the grinding disc 11 is of no consequence. The grinding disc will always contact the surface S at the point $x_2$ (only the deflection a of the actuator 20, when in the stationary state (position $x_3$), will depend on the diameter of the grinding disc). Contacting the surface vertically, however, is also undesirable in some applications, as this creates the risk that too much material will be removed from the surface S at the point $x_2$. For optimum results, in some applications it is desirable for the grinding disc 11 to contact the surface S after the grinding machine has already reached the desired advancement speed parallel to the surface S. Under such circumstances, the approach outlined in FIG. 7c (parallel shifting of the TCP) may be better.

Figure 8:
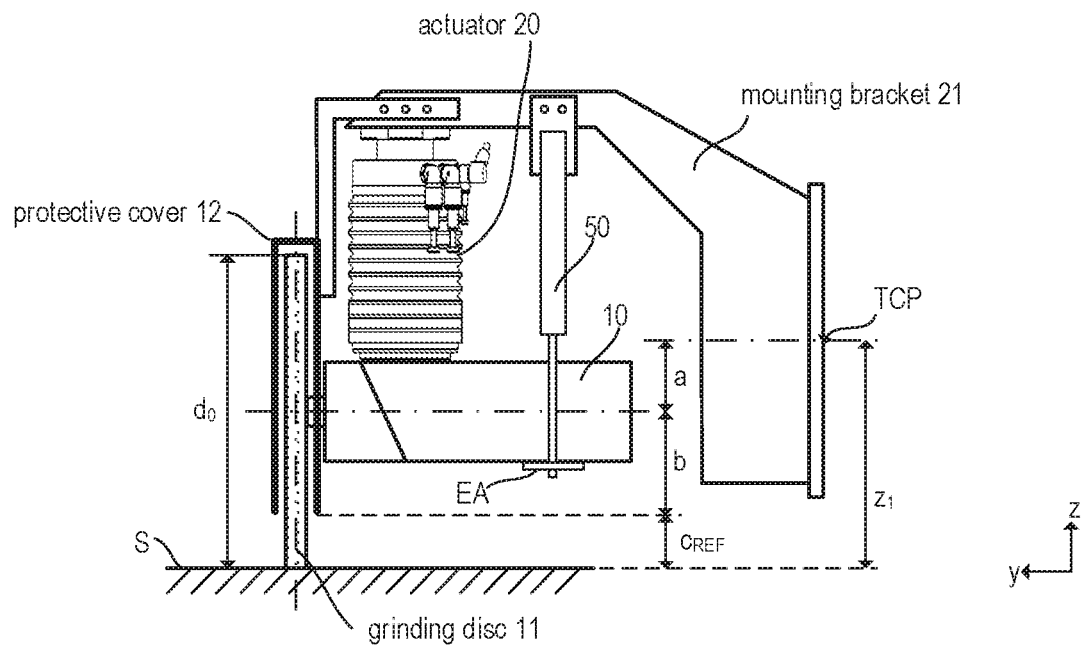
FIG. 8 is a schematic illustration of a further embodiment in which the linear actuator that connects the grinding machine and the TCP rests against an adjustable end stop when there is no contact between workpiece and grinding tool. The adjustment of the end stop can be carried out dependent on the size of the grinding tool.
Figure 9:
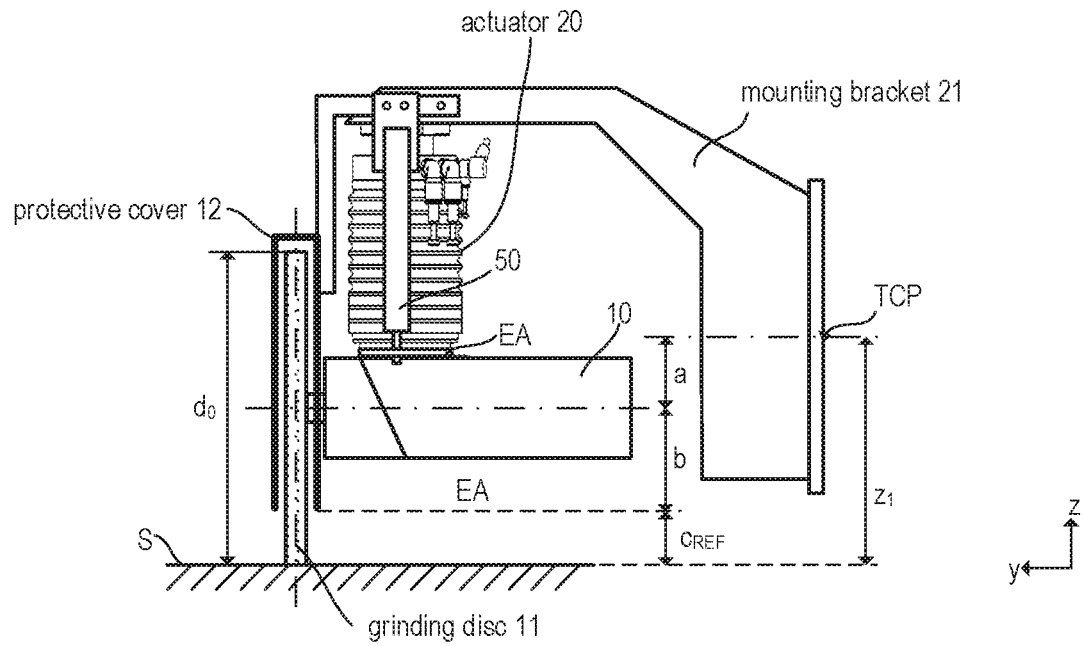
FIG. 9 shows an alternative to the embodiment illustrated in FIG. 8.

With the embodiments illustrated FIGS. 8 and 9, the same results as in FIG. 7c can be obtained without the necessity of adapting the TCP of the manipulator 1. As previously mentioned, here the force controlled actuator 20 rests against its end stop (its deflection a corresponding to the maximum deflection $a_{MAX}$), as long as no contact exists between the surface S of the workpiece W and the grinding disc 11. The position of the grinding disc 11 relative to the surface is thus determined by the pose of the TCP (see FIG. 8 or 9, distance $z_1$) and the maximum deflection $a_{MAX}$ of the actuator. In the examples in accordance with FIGS. 8 and 9, the distance between the surface S and the axis of rotation R of the grinding disc 11 equals $z_1-a_{MAX}$ (as long as no contact exists, afterwards it equals $z_1-a$). Instead of shifting the TCP trajectory closer to the surface, the end stop of the actuator 20 can also be moved closer to the surface. This would result in the maximum deflection $a_{MAX}$ becoming larger and produce the same results as shifting the TCP trajectory.

The examples in FIGS. 8 and 9 are essentially identical to the example of FIG. 6, except for the adjustable end stop EA for the actuator 20. In both examples (FIGS. 8 and 9), the position of the end stop EA relative to the mounting bracket 21 can be adjusted by means of a positioning element 50 (e.g. electric linear actuator, spindle drive or any other positioning element with or without a drive). In the example of FIG. 9, the lower end of the actuator 20 rests directly against the (adjustable with the positioning element 50) end stop EA. In the example of FIG. 8, the lower end of the motor housing of the grinding machine rests against the end stop EA. Even though it is the motor housing of FIG. 8 that rests against the end stop EA, this end stop still effectively functions as an end stop for the actuator 20, as the grinding machine 10 is rigidly connected to the lower end of the actuator 20.

Figure 10:
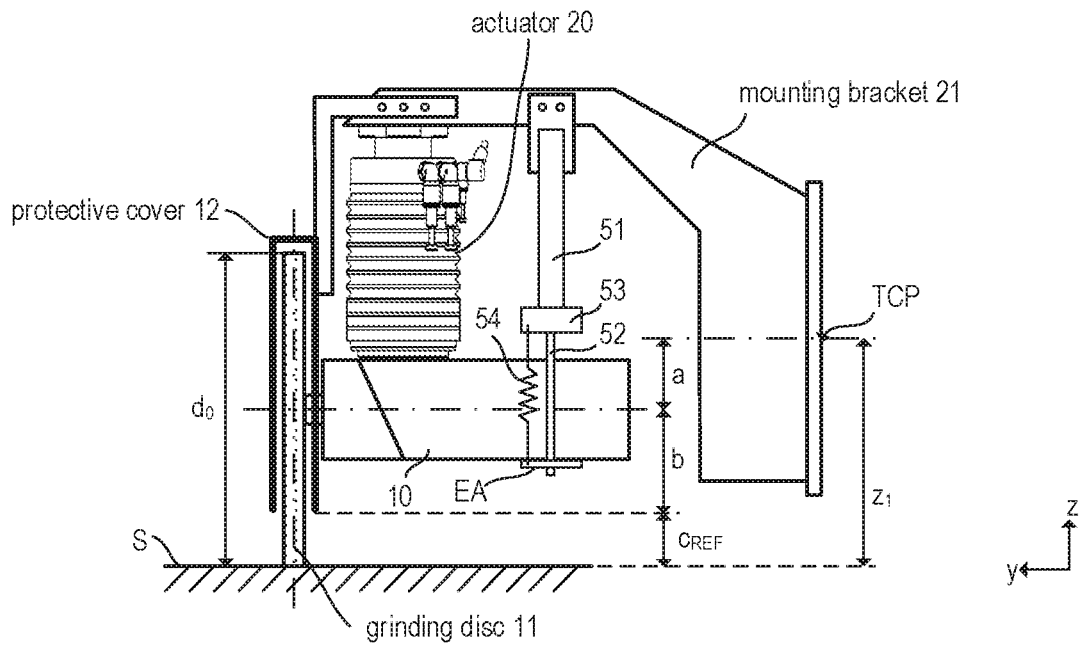
FIG. 10 shows a further alternative to the embodiment illustrated in FIG. 8, here with a rod blocking device for adjusting the end stop instead of an additional actuator.

The positioning element for adjusting the end stop EA can also be formed by the actuator 20 and a completely passive element (such as, e.g. a brake or blocking element). The example shown in FIG. 10 is essentially identical to the example of FIG. 8, wherein the positioning element 50 has been replaced by a (piston) rod blocking device. A rod blocking device is essentially a rod 52 in a linear guide 51 that can be fixated at any position (within a defined range of movement) by means of a blocking element 53 (e.g. an electromechanical or pneumatic brake/clamp). Rod blocking devices are well known and will therefore not be further described here. When the blocking element 53 is disengaged, it can be used to position the end stop EA, e.g. with the aid of a spring element 54, closer to the grinding machine 10 in order to keep the end stop EA in the desired position at the housing of the grinding machine 10. When the blocking element is activated (the rod 52 is blocked in the linear guide 51), the spring force of the spring element 54 produces no effect (the spring element 54 does not act upon the actuator 20). The spring element 54 is optional and depends on the reference position of the TCP. For example, the reference position of the TCP may be set so that the grinding disc rests upside down on the surface S. In this case the weight force of the piston rod 52 alone suffices to keep it in the desired position (resting against the housing of the grinding machine 10) even when the brake 53 is disengaged.

In order to adjust the position of the end stop EA, the manipulator can move the TCP to a given reference position (distance) relative to a reference surface S (as, e.g. in FIG. 8, distance $z_1$ to surface), upon which the grinding disc 11 contacts the surface S. This is carried out while the rod blocking device is disengaged (inactive). The deflection $a_{EA}$ of the actuator 20 now depends on the present diameter $d_1$ of the grinding disc 11. The rod blocking device is then blocked in this reference position (TCP in position $z_1$), which results in the current deflection $a_{EA}$ of the actuator 20 being "saved" as the maximum deflection (and thus de facto as the position of the end stop). The position of the end stop $a_{EA}$ ($a_{EA}=z_1-d_1/2$) is thereby adjusted so that the grinding disc 11 always contacts at a TCP position of $z=z_1$ when performing a grinding operation (cf. FIG. 7), regardless of the actual diameter $d_1$ of the grinding disc 11 (a change in the diameter $d_1$ is compensated by a change in the position $a_{AE}$).

Figure 11:
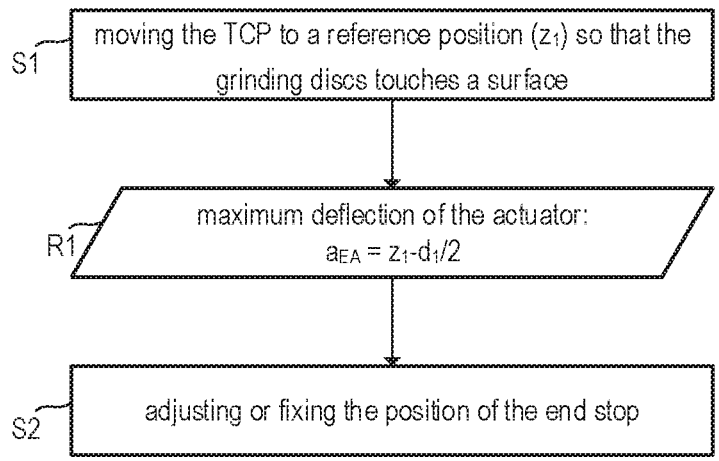
FIG. 11 is a flow chart illustrating an exemplary method for the automatic adjustment/adaptation of the end stop.

FIG. 11 illustrates with the use of a flow chart an example of a method for operating a robot-supported grinding apparatus with automated adjustment/adaptation of the end stop EA that determines the maximum deflection $a_{EA}$ of the actuator 20. Suitable grinding apparatuses were described further above with reference to FIGS. 7 to 10. First, the manipulator 1 moves its TCP into a reference position (relative to a surface S), which is designated in the examples of FIGS. 8-10 as $z=z_1$ (FIG. 11, step S1). In this reference position the grinding disc 11 contacts the surface S, wherein the deflection a of the actuator 20 depends on the current diameter $d_1$ of the grinding disc. In the examples of FIGS. 8-10 it holds true that $a=z_1-d_1/2$ (FIG. 11, result R1). This deflection can be "saved" as the maximum deflection, e.g. by activating the rod blocking device (cf. FIG. 10) or by adapting the position of the end stop EA with the aid of a positioning element 50 (cf. FIG. 8 or 9), thus setting the current deflection a of the actuator 20 as the maximum deflection $a_{EA}$.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An apparatus for robot-supported grinding, the apparatus comprising:
    a manipulator;
    a linear actuator;
    a grinding machine with a rotating grinding tool, the grinding machine being coupled with the manipulator via the linear actuator;
    an end stop that defines a maximum deflection of the linear actuator, wherein a position of the end stop is adjustable; and
    a control configured to adjust the end stop based on a size of the rotating grinding tool.

2. The apparatus of claim 1, wherein the control is configured to adjust the end stop using a positioning element.

3. The apparatus of claim 2, wherein the positioning element comprises a rod blocking device.

4. The apparatus of claim 3, wherein the control is configured to disengage the rod blocking device, move a tool center point of the manipulator into a reference position in which the rotating grinding tool contacts a surface, and activate the rod blocking device in order to fixate the position of the end stop.

5. The apparatus of claim 2, wherein the positioning element includes a linear electric drive.

6. The apparatus of claim 1, wherein the control is configured to adjust the position of the end stop based on a diameter of the rotating grinding tool.

7. The apparatus of claim 1, wherein the control is configured to move a tool center point of the manipulator into a reference position in which the rotating grinding tool contacts a surface, and to adjust the position of the end stop such that a current deflection of the linear actuator equals the maximum deflection defined by the position of the end stop.

8. The apparatus of claim 1, wherein the control is configured to move a tool center point of the manipulator into a reference position in which the rotating grinding tool contacts a surface, and to adjust the position of the end stop in dependency on a current deflection of the linear actuator.

9. A method for operating a robot-supported grinding apparatus that comprises a manipulator, a linear actuator with an adjustable end stop and a grinding machine with a rotating grinding tool, the grinding machine being coupled with the manipulator via the linear actuator, the method comprising:
 defining a maximum deflection of the linear actuator by the end stop of the linear actuator; and
 adjusting a position of the end stop of the linear actuator based on a size of the rotating grinding tool.

10. The method of claim 9, wherein the rotating grinding tool is a grinding disc and the position of the end stop is adjusted based on a diameter of the grinding disc.

11. The method of claim 9, wherein adjusting the position of the end stop comprises:
 moving a tool center point of the manipulator into a reference position in which the rotating grinding tool contacts a surface; and
 adjusting the position of the end stop such that a current deflection of the linear actuator equals the maximum deflection defined by the position of the end stop.

12. The method of claim 9, wherein adjusting the position of the end stop comprises:
 moving a tool center point of the manipulator into a reference position in which the rotating grinding tool contacts a surface; and
 adjust the position of the end stop in dependency on a current deflection of the linear actuator.

13. The method of claim 9, wherein adjusting the position of the end stop comprises:
 disengaging a rod blocking device to enable shifting the position of the end stop;
 moving a tool center point of the manipulator into a reference position in which the rotating grinding tool contacts a surface; and
 activating the rod blocking device to fixate the position of the end stop.

14. An apparatus for robot-supported grinding, the apparatus comprising:
 a manipulator;
 a linear actuator;
 a grinding machine with a rotating grinding tool, the grinding machine being coupled with the manipulator via the linear actuator;
 an end stop that defines a maximum deflection of the linear actuator, wherein a position of the end stop is adjustable;
 a rod blocking device coupled to the end stop; and
 a control configured to disengage the rod blocking device, move a tool center point of the manipulator into a reference position in which the rotating grinding tool contacts a surface, and activate the rod blocking device in order to fixate the position of the end stop.

15. A method for operating a robot-supported grinding apparatus that comprises a manipulator, a linear actuator with an adjustable end stop and a grinding machine with a rotating grinding tool, the grinding machine being coupled with the manipulator via the linear actuator, the method comprising:
 defining a maximum deflection of the linear actuator by the end stop of the linear actuator; and
 adjusting a position of the end stop of the linear actuator by:
  disengaging a rod blocking device to enable shifting the position of the end stop;
  moving a tool center point of the manipulator into a reference position in which the rotating grinding tool contacts a surface; and
  activating the rod blocking device to fixate the position of the end stop.

\* \* \* \* \*